3,773,752
RECOVERY OF MICROBIAL POLYSACCHARIDES
Ben B. Buchanan and John E. Cottle, Bartlesville, Okla.,
assignors to Phillips Petroleum Company
No Drawing. Filed Feb. 25, 1971, Ser. No. 118,946
Int. Cl. C12d 13/04
U.S. Cl. 260—209 R        10 Claims

ABSTRACT OF THE DISCLOSURE

A method of recovering microbial polysaccharides produced from the fermentation of carbohydrates by the action of the bacteria of the genus Xanthomonas in which the fermentor liquor is diluted with an aqueous solution of an alkali metal salt, the resulting solution being coagulated and filtered and the resulting solution of polysaccharides is recovered.

---

This invention relates to the recovery of microbial polysaccharides.

In one of its more specific aspects, this invention relates to the recovery of polysaccharides from fermentation liquor in a state satisfactory for use as waterflood additives.

The fermentation of carbohydrates by the action of bacteria of the genus Xanthomonas is well known. Particularly known is the action by the bacteria *Xanthomonas campestris* NRRL B–1459 on glucose.

Relatedly, various processes have been concerned with the recovery and purification of the microbial polysaccharides from the fermentation broths. Such recovery is desirable inasmuch as the product from the fermenter has such a high viscosity that it is frequently unsuitable for various purposes to which it could be put to use if it possessed a lower viscosity. Similarly, in certain usages, the bacteria in the fermentation liquid acts adversely to the use to which the liquor is put. Unfortunately, however, most of the processes which have been developed for the recovery of the polysaccharides involve the use of expensive materials and complicated apparatus. The method of the present invention avoids these disadvantages.

According to the method of this invention there is provided a process for the recovery of a solution comprising polysaccharides from an aqueous solution of heteropolysaccharides produced by the action of bacteria of the genus Xanthomonas on a carbohydrate which comprises diluting the solution of heteropolysaccharides with an aqueous salt solution to a specified viscosity, coagulating the solution, and filtering the coagulated solution and recovering the filtrate as the polysaccharide solution.

The method of this invention is applicable to the recovery of a solution comprising polysaccharides from an aqueous solution of heteropolysaccharides by the action of the genus Xanthomonas, including *Xanthomonas begoniae, Xanthomonas compestris, Xanthomonas carotae, Xanthomonas hederae, Xanthomonas incani, Xanthomonas malvacearum, Xanthomonas papavericola, Xanthomonas phaseoli, Xanthomonas pisi* and *Xanthomonas translucens*.

Generally, such solutions will contain from about 0.5 to about 4 weight percent of the heteropolysaccharides and will have a viscosity within the range between about 500 to about 50,000 cp. at room temperature. The fermentor liquor will comprise, in addition to the heteropolysaccharide, the bacterial cells and unconverted carbohydrate.

The polysaccharide solution is diluted with an aqueous solution of an alkali metal salt. Preferably, an alkali halogen salt will be used, such salts including sodium chloride, calcium chloride, sodium bromide, and the like, and their mixtures. A solution of sodium chloride or clarified sea water is preferred. The salt solution will have a viscosity of from about 10 to about 20 cp. at room temperature.

The polysaccharide solution and the aqueous salt solution are combined in quantities sufficient to produce a combined mixture having a viscosity of from about 10 to about 30 cp. at room temperature, as determined by a Brookfield viscosometer at 6 r.p.m., room temperature.

The polysaccharide solution and the aqueous salt solution can be mixed at any temperature. Thereafter, the resulting mixture can be coagulated by agitating the solution for a period at a temperature below its boiling point and preferably at a temperature of from about 75° to about 95° C.

After this first coagulation, or in its absence, to the combined solution there can be added a coagulant in an amount of from about 2 to about 250 p.p.m. by weight. Any coagulant can be used with potassium aluminum sulfate (alum) being preferred. After this addition, the combined solution is agitated at the aforementioned temperature for a period sufficient to promote further coagulation.

The solution is then filtered and the filtrate is recovered as the polysaccharide solution. Any conventional filtration can be employed although the filtration will be preferably conducted at about the temperature at which the solution has been agitated and at a subatmospheric pressure to facilitate the filtration. Preferably, a precoated filter and a filter aid are employed.

The method of this invention is illustrated by the following example in which it was desired to recover a polysaccharide from a fermentation liquor.

The fermentation liquor was diluted with clarified sea water until the resulting solution had a viscosity of 12 cp. The combined solution was then heated to 95° C. at which temperature it was maintained for about 2 hours. To the hot solution, alum in the amount of about 10 p.p.m. by weight of the solution was added and the solution was agitated and maintained at a temperature of about 95° C. for a period of 2 hours at the end of which period, no further coagulation appeared to be taking place.

The solution was then filtered through a precoated filter at a temperature of about 75° C., the filtrate being recovered as the polysaccharide solution.

The resulting solution was clear and usable as a viscosifier in a secondary oil recovery waterflood process.

It will be understood that various modifications can be made to this invention. However, such modifications are considered to be within the scope of this invention.

We claim:

1. A method of recovering polysaccharides from a heteropolysaccharide solution produced from the fermentation of carbohydrates by the action of the bacteria of the genus Xanthomonas which comprises:
   (a) diluting said heteropolysaccharide solution with an aqueous solution of an alkali metal salt to produce a diluted solution having a viscosity of from about 10 to about 20 cp.;
   (b) coagulating said diluted solution; and,
   (c) filtering said solution and recovering said filtrate containing microbial polysaccharides.

2. The method of claim 1 in which said solution is coagulated by agitating said solution at a temperature below the boiling point of said solution and adding a coagulant to said solution.

3. The method of claim 1 in which said alkali metal is sodium chloride.

4. The method of claim 1 in which said aqueous solution of an alkali metal salt comprises sea water.

5. The method of claim 2 in which said solution is agitated at a temperature of from about 75° to about 95° C. and said coagulant is potassium aluminum sulfate.

6. The method of claim 2 in which said coagulant is added to said solution in an amount from about 2 to about 250 p.p.m. by weight.

7. The method of claim 1 in which said filtering is conducted at subatmospheric pressure.

8. The method of claim 1 in which said aqueous solution of an alkali metal salt comprises clarified sea water, the diluted solution has a viscosity of about 12 cp. and said diluted solution is coagulated by agitation at a temperature of about 95° C. and by the addition of alum to said diluted solution, said alum being added to said diluted solution in the amount of about 10 p.p.m. by weight.

9. A method of recovering polysaccharides from a heteropolysaccharide solution produced from the fermentation of carbohydrates by the action of bacteria of the genus Xanthomonas which comprises:
   (a) diluting said heteroploysaccharide solution with an aqueous solution of an alkali metal salt to produce a diluted solution having a viscosity of from about 10 to about 20 cp.;
   (b) coagulating said diluted solution by contacting said diluted solution with a coagulant; and,
   (c) filtering said solution and recovering said filtrate containing microbial polysaccharides.

10. The method of claim 9 in which said coagulant is potassium aluminum sulfate.

References Cited
UNITED STATES PATENTS
3,382,229   5/1968   Patton et al. _____ 195—31 P LIONEL M. SHAPIRO, Primary Examiner U.S. Cl. X.R.

195—31 P